Nov. 2, 1937.  E. R. EVANS  2,097,873
REACTION TYPE POWER BRAKE UNIT
Filed April 10, 1934  9 Sheets-Sheet 8
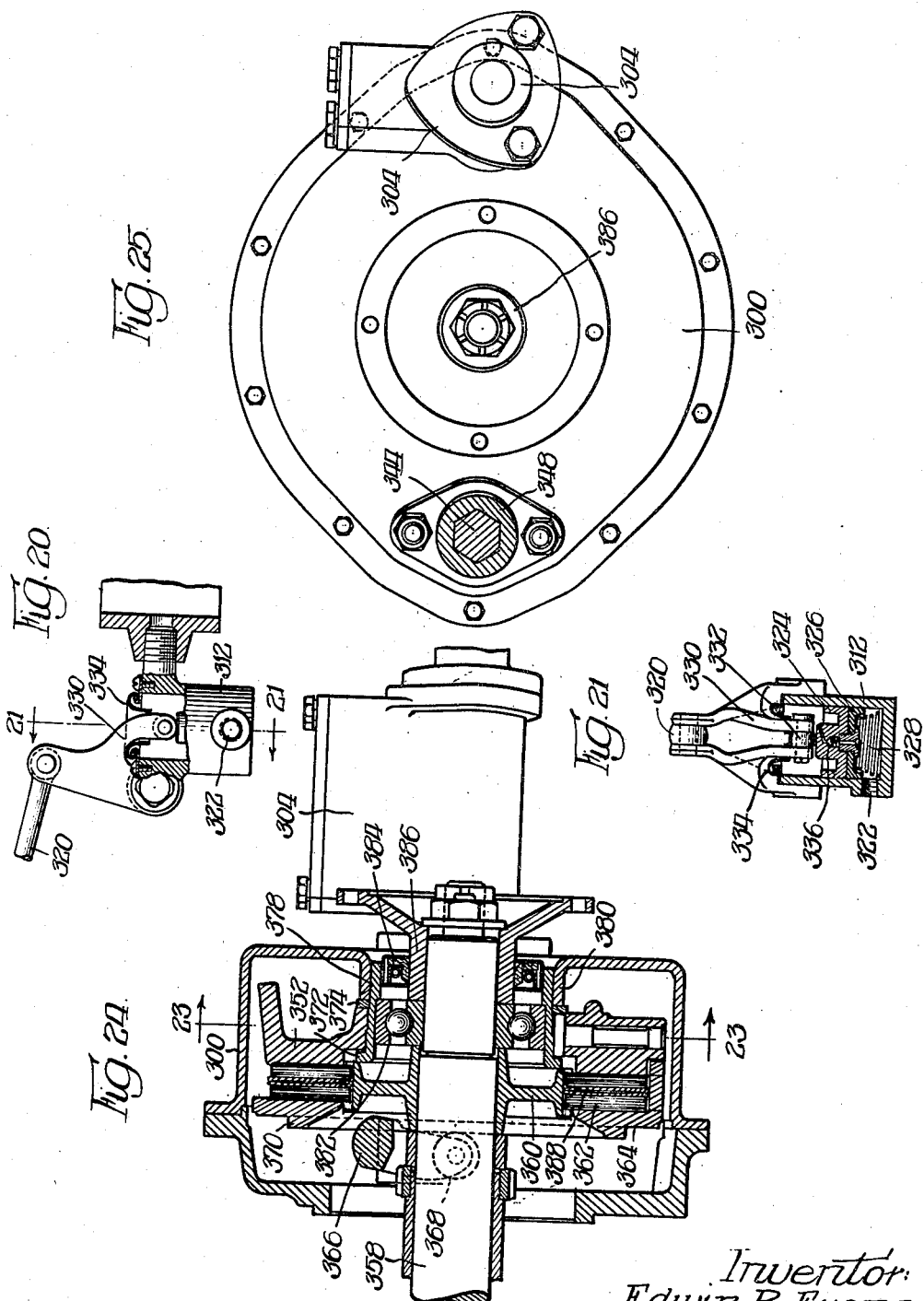
Inventor:
Edwin R. Evans,
attys.

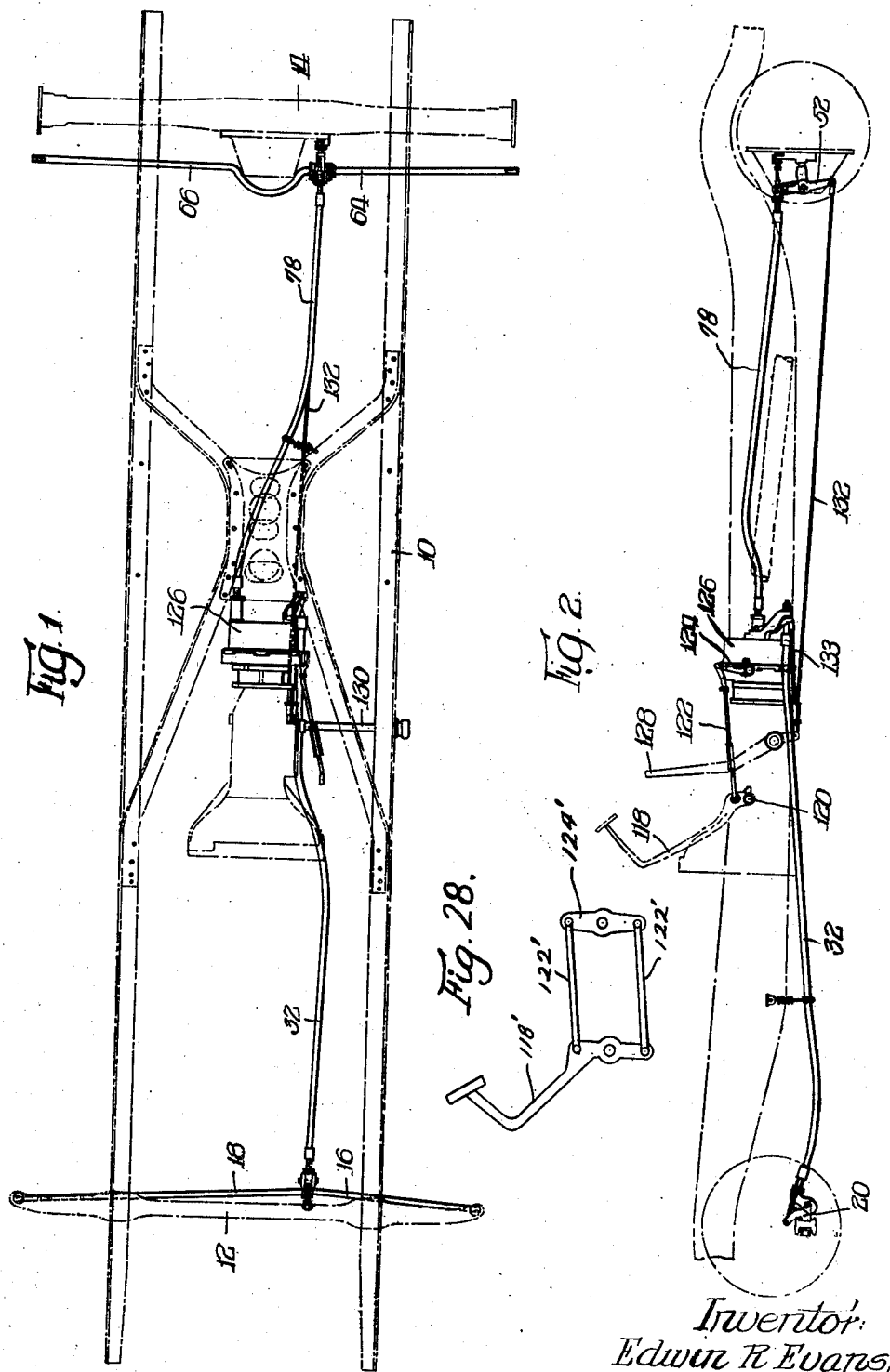

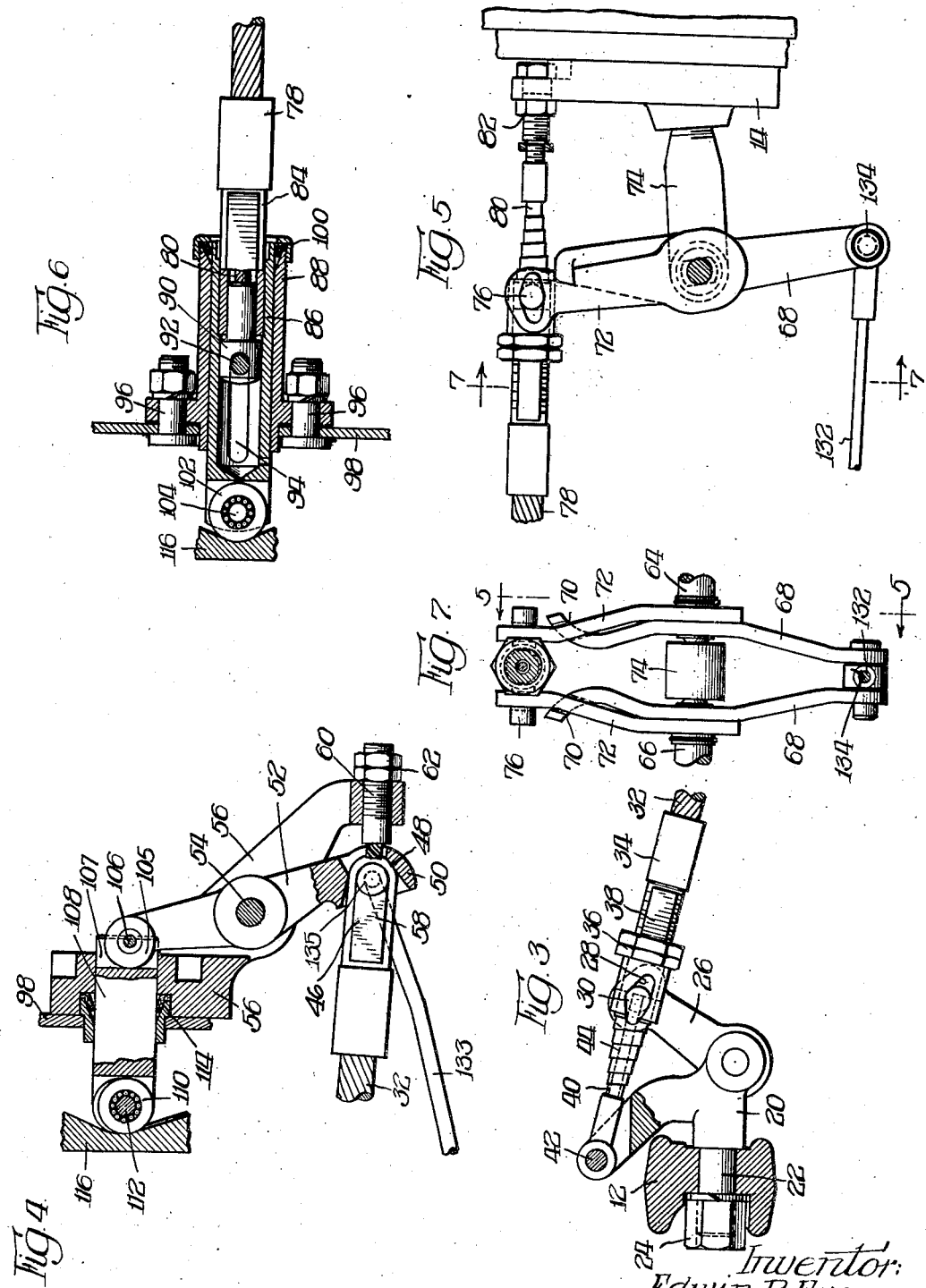

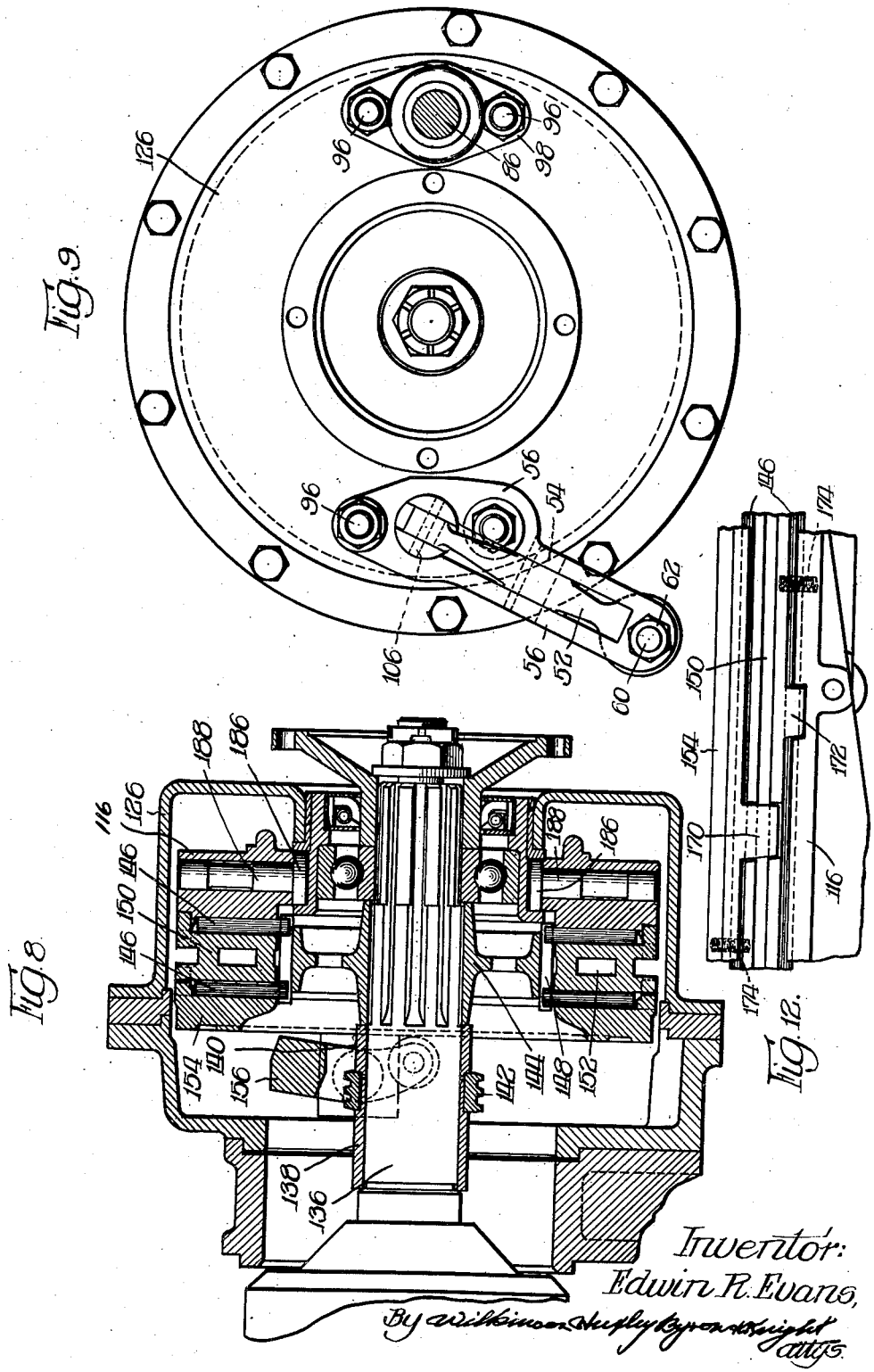

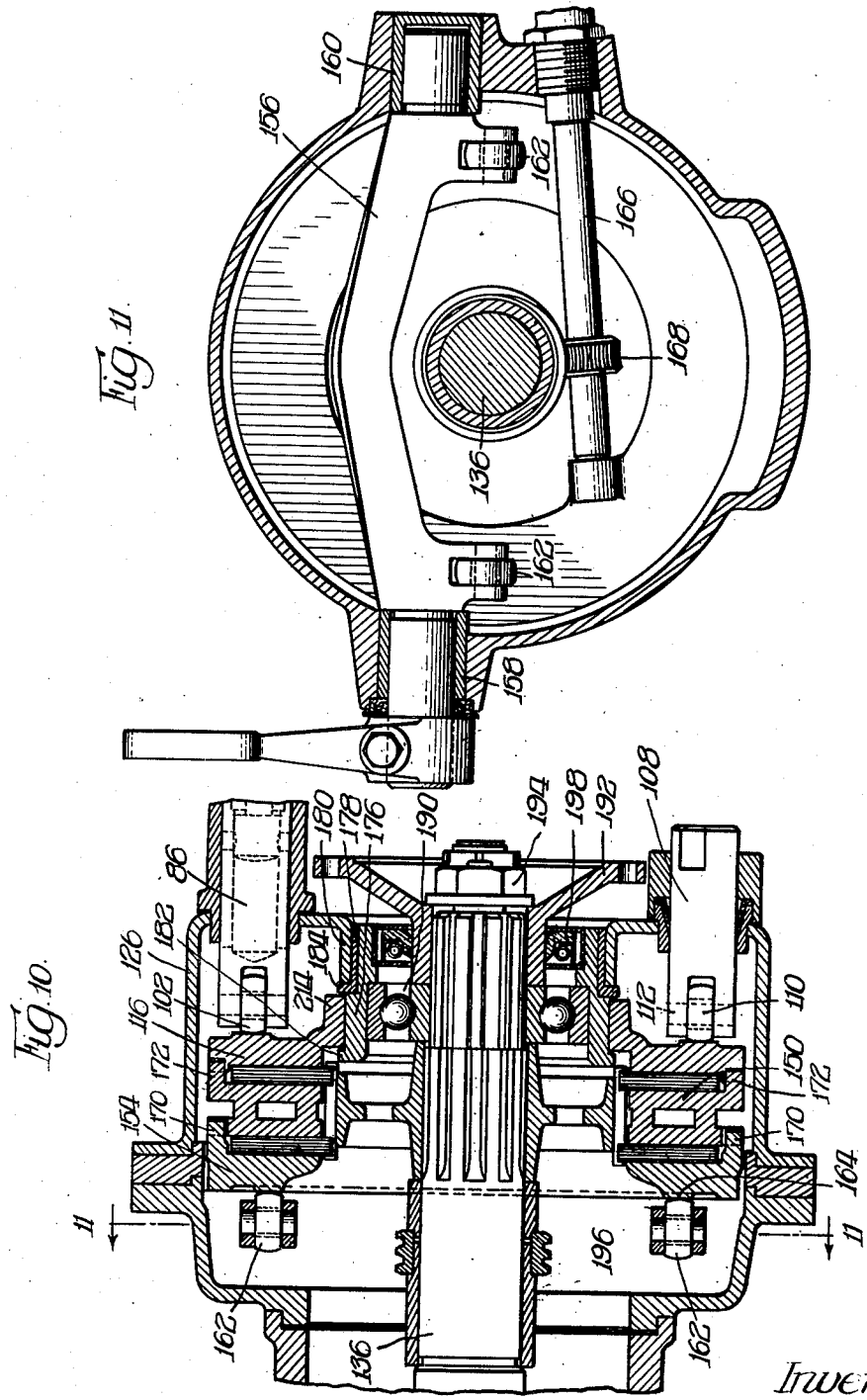

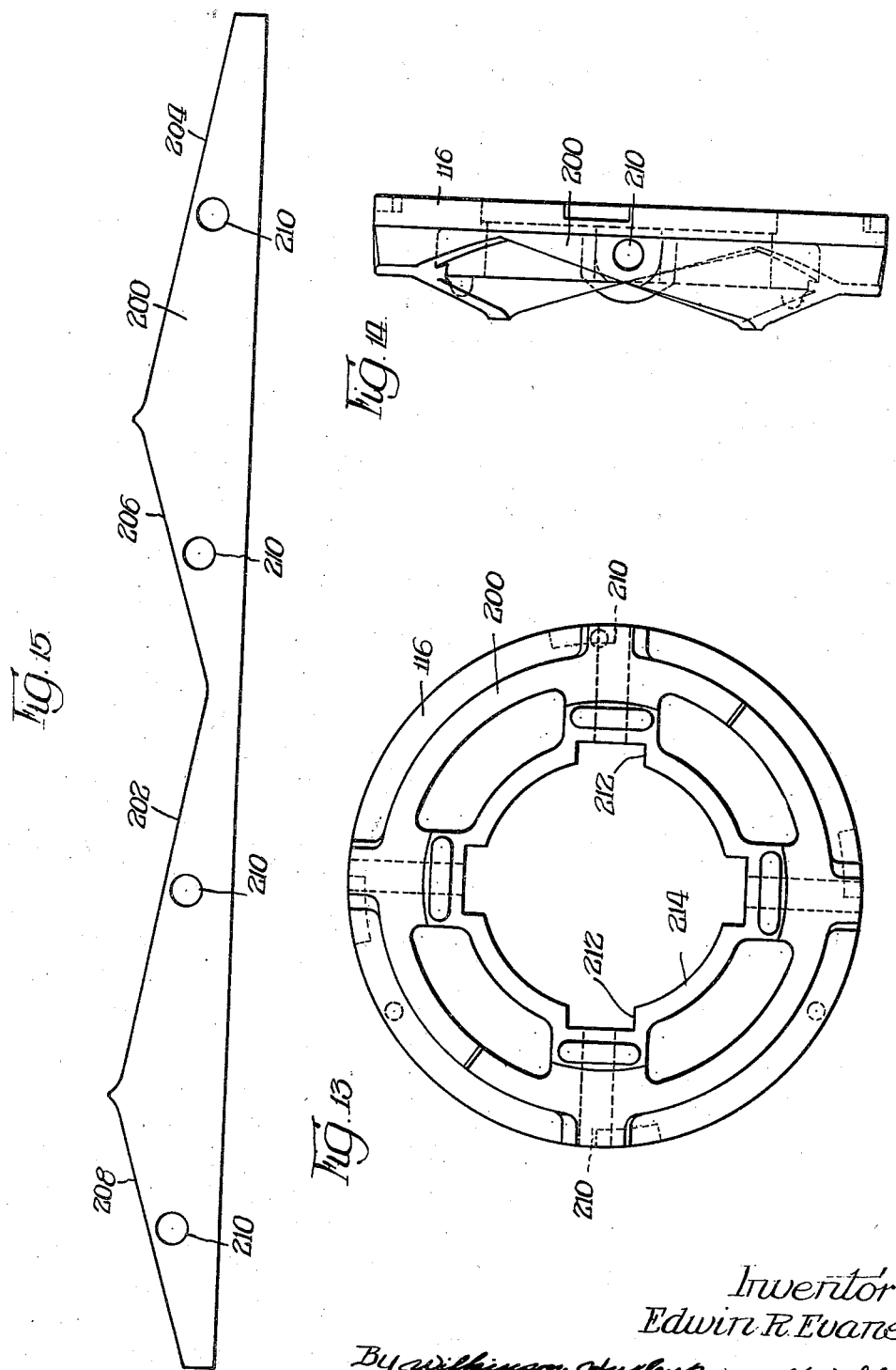

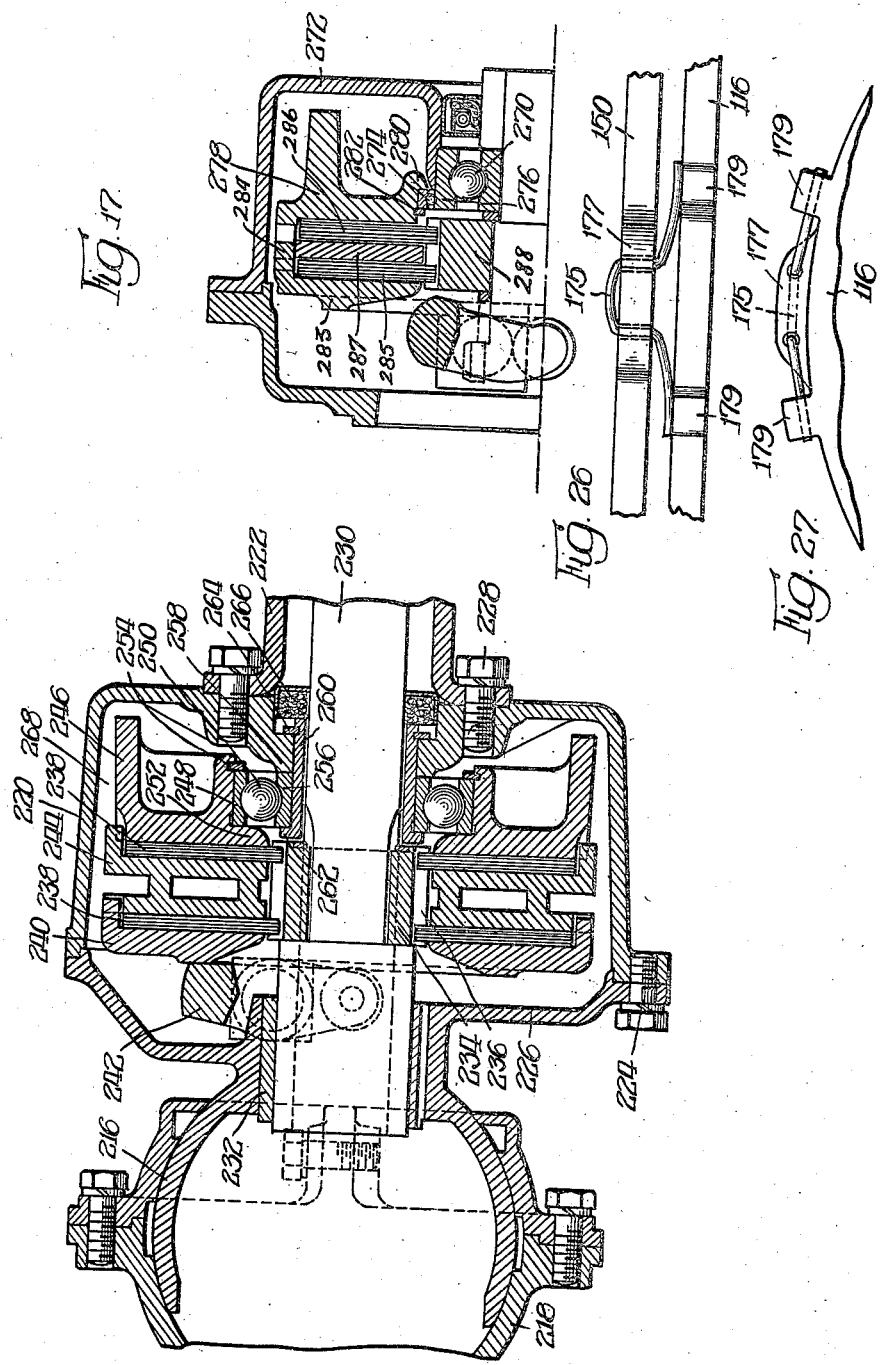

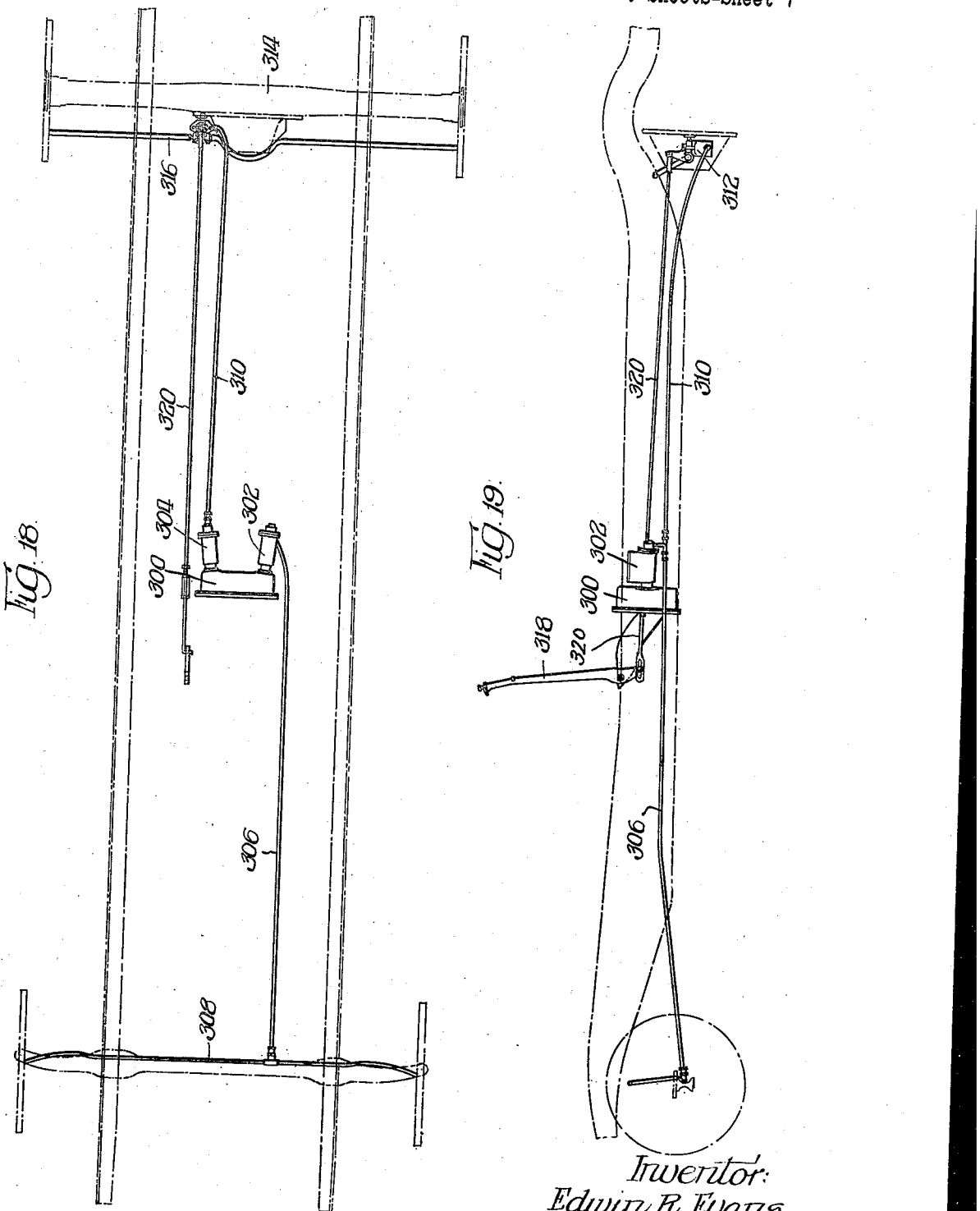

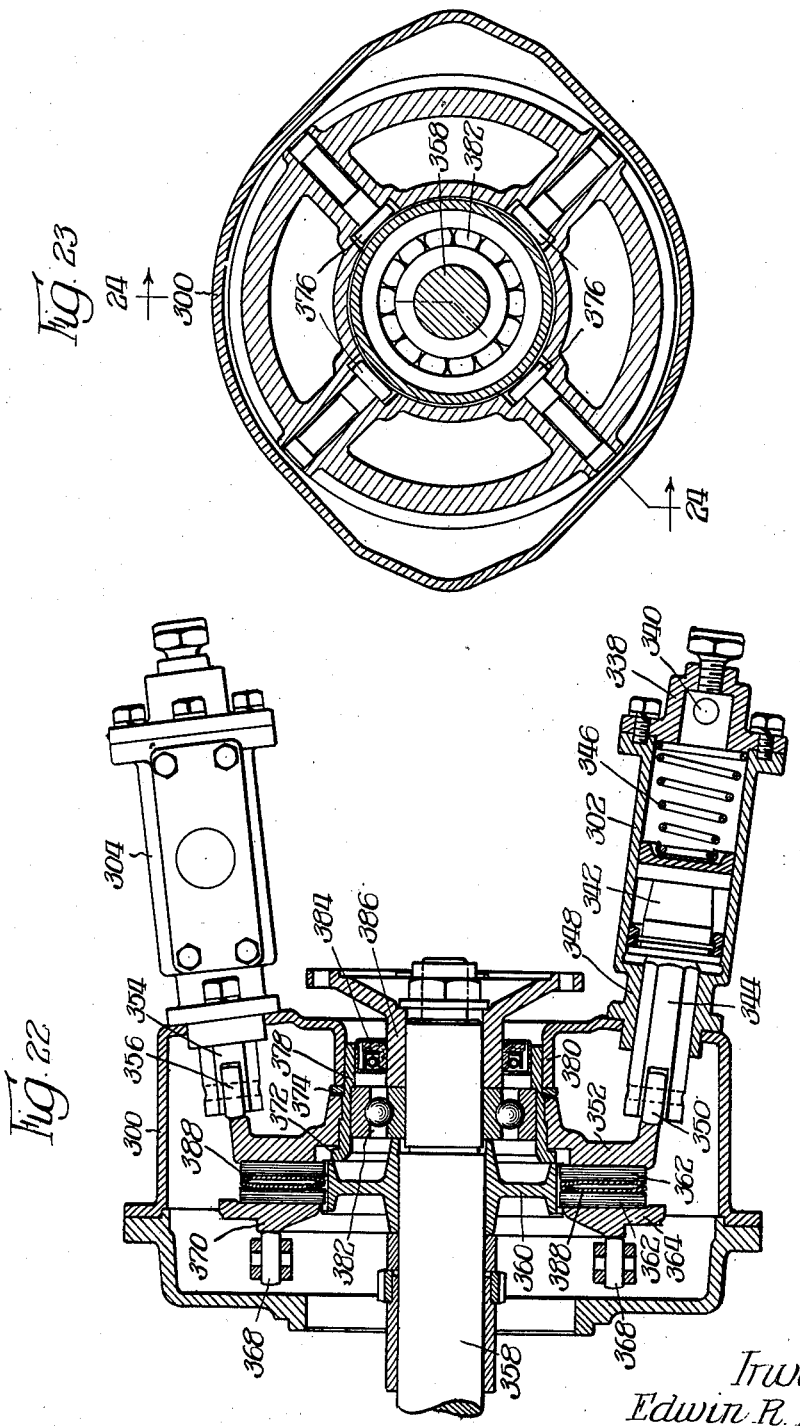

Patented Nov. 2, 1937

2,097,873

UNITED STATES PATENT OFFICE 2,097,873

REACTION TYPE POWER BRAKE UNIT

Edwin R. Evans, Kenilworth, Ill.

Application April 10, 1934, Serial No. 719,913

32 Claims. (Cl. 188—140)

This invention relates to improvements in a reaction power brake unit and a system of brake linkages for transmitting the brake actuating force from the power brake unit to the wheel brakes of the vehicle.

Various types of power brake systems have been suggested in which the power of the propeller shaft of a motor vehicle is utilized to assist in the braking action. The principal purpose of the power brake unit is to take up the slack in the brake linkage in order that the total travel of the pedal will be relatively small. If the slack is properly taken up by the power brake unit, the pedal can then act directly through the mechanical linkage to apply the braking force to the wheel brakes and it is not necessary to provide any amplification of the braking pressure by the power brake unit itself. In one type of power brake unit a friction element rotates positively with the power shaft and a normally stationary friction element is forced into engagement with the positively rotating friction element, whereby the rotation of the normally stationary member acts through the brake linkage to take up the slack. In this form however it has been customary to apply the input pressure in such manner that it acts against a fixed abutment in holding the friction elements in engagement and the reaction in the output brake linkage is opposed only by the frictional torque developed between the friction elements. This form of the power brake device will not provide the best modulation of the braking pressure throughout the range of effective braking.

According to my invention the reaction developed in the power brake unit acts directly in opposition to the application of the input force by proper design of the cam surfaces of the output pressure plate in relation to the co-efficient of friction between the friction elements. However, since it is well known that absolute uniformity of co-efficient of friction is impossible under all conditions of temperature, speed and pressure and to take care of excessive pedal pressures, it is advisable to employ thrust shoulders or some means for taking up the thrust in opposite directions, cooperating with the output cam plate to prevent excessive transmission of the input force through to the output or excessive transmission of the brake reaction back to the pedal.

It is an object of my invention to provide a power brake unit which is simpler in construction and less expensive to manufacture than the present known power brake units.

It is further an object of my invention to provide a power brake unit in which the brake reaction developed, as the power brake unit operates to take up the slack in the linkage, acts directly in opposition to the input force in such manner that the output force is exactly proportional to the input force and a uniform modulation is obtained throughout the braking range.

It is further an object of my invention to provide a construction in which an output cam plate is provided in the power brake unit in which the cam surfaces are designed in accordance with the co-efficient of friction between the cooperating friction members in order that substantial perfect modulation of the braking action can be obtained.

A still further object of my invention is to provide a power brake unit associated with a hydraulic braking system in such a manner that the hydraulic connections for one set of brakes are entirely independent of the hydraulic connection for the other set of brakes in order that failure of the pressure line will not result in the loss of more than one set of brakes.

It is an object of my invention to divide the output from the power brake unit by the provision of plungers acted upon by the cam plate and movable angularly or parallel to the axis of the shaft but on opposite sides thereof, each plunger may be employed for transmitting the braking force mechanically or hydraulically to one pair or set of brakes in order that mechanical or hydraulic failure in the output linkage will not result in complete loss of control of the brakes by the power brake unit; emergency control of one or more set of brakes may also be provided.

A still further object of my invention is to provide a cable conduit arrangement for the transmission of the brake actuating force from the power brake unit in such manner that the braking force is transmitted by compression through the conduit instead of by tension upon the cable as is customary practice.

Further objects and advantages of the present improvements will be more readily apparent from the following description taken in connection with the attached drawings, in which—

Figure 1 is a diagrammatic plan view of a chassis illustrating the brake linkage;

Figure 2 is a side elevation of the brake linkage shown in Figure 1;

Figure 3 is an enlarged detail, partially in section, showing the cable conduit connection to the rock shafts carried by the front axle;

Figure 4 is an enlarged detail, partially in section, showing the connection from the cam plate of the power brake unit to the front cable conduit;

Figure 5 is an enlarged detail view, partially in section, showing the connection of the cable conduit to the rear brake cross shafts;

Figure 6 is an enlarged detail view partially in section illustrating the connection from the cam plate to the rear cable conduit;

Figure 7 is a sectional view on the plane indicated 7—7 in Figure 5;

Figure 8 is a longitudinal section taken vertically through the power brake unit;

Figure 9 is an end view of the power brake unit;

Figure 10 is a longitudinal section taken horizontally of the power brake unit;

Figure 11 is a sectional view taken on the plane indicated 11—11 in Figure 10;

Figure 12 is a detail end elevation of the friction plates showing certain modifications;

Figure 13 is a plan view of the output cam plate;

Figure 14 is an end view of the output cam plate;

Figure 15 shows the development of the cam surfaces;

Figure 16 is a longitudinal section taken vertically through a modified form of the power brake unit;

Figure 17 is a detail vertical section illustrating a further modification;

Figure 18 is a diagrammatic plan view illustrating hydraulic connections from the power brake unit;

Figure 19 is a diagrammatical elevational view of the hydraulic linkage shown in Figure 18;

Figure 20 is a detail view partially in section illustrating the hydraulic piston and cylinder connection to the rear cross shafts;

Figure 21 is a detail section taken on the plane indicated 21—21 in Figure 20;

Figure 22 is a longitudinal section taken horizontally through the power brake unit shown in Figures 18 and 19;

Figure 23 is a cross section on the plane indicated 23—23 in Figure 24;

Figure 24 is a sectional view taken on the plane indicated 24—24 in Figure 23;

Figure 25 is an end elevation partially in section;

Figures 26 and 27 are detail views of a modified form of spring which may be used for separating the plates, and Figure 28 is a conventional showing of a push pull pedal.

Referring to Figures 1 and 2, there is shown, diagrammatically, a chassis 10, front axle 12 and rear axle 14. The wheels and wheel brakes, which may be of ordinary construction, have not been illustrated. The front wheel brakes are operated by the rock shafts 16—18 which are pivoted at their inner ends to the bracket 20 fastened by pin 22 and nut 24 to the axle 12. The rock shafts 16—18 have integral therewith, at their inner ends, lever arm 26, having slots 28 therein. Referring to Figure 3, a T-connection 30 transmits operative movement to the lever arms 26 and rock shafts 16—18, derived from compressive movement of the cable conduit 32. The connection of the cable conduit 32 to the T-member 30 is through an end member 34 threaded for cooperation with the adjusting nuts 36 and having flat sides 38 cooperating with T 30 to prevent rotation and untwisting of the cable conduit. The inner cable 40 is anchored at 42 on the bracket 20 and a spiral ribbon spring 44 may be employed to shield the space between the cable 40 and the movable end of the cable conduit 32 and also to act as a return spring.

In Figure 4, the cable conduit 32 has a thrust member 46 at its end, having a spherical bearing 48 in the socket 50 of double arm lever 52, which is pivoted at 54 on bracket 56. The thrust member 46 is also formed with flattened sides 58 to prevent rotation of the cable conduit with respect to the socket 50 of lever 52. The cable which extends through the cable conduit is anchored at 60 on the bracket 56 and the connection 60 is adjustable by the provision of lock nuts 62.

A similar cable conduit connection is employed for operating the rear brakes. Thus, in Figures 5 and 7 I have shown rear brake rock shafts 64—66 having secured at their inner ends, double arm levers 68 which have slots 70 at their upper ends to receive and permit lost motion with respect to levers 72 which are rotatably mounted on the rock shafts 64—66 respectively. The inner ends of the rock shafts are pivotally mounted in the bracket 74 which is carried by the rear axle 14. The levers 72 are connected by a T-connection 76 to which the rear brake cable conduit 78 is connected. The cable 80 within the conduit 78 is adjustably anchored at 82 on the rear axle.

At its opposite end, as shown in Figure 6, the cable conduit 78 is formed as a thrust receiving sleeve 84 mounted in thrust sleeve 86 which is slidably mounted in the fixed housing or bracket 88. The cable 80 is anchored to abutment 90 which is held in fixed position by pin 92 carried by housing 88. The sleeve 86 has slots 94 whereby it is movable with respect to the abutment member 90 but is held against rotation by the pin 92. The bracket 88 is fixed by nut and bolt connections 96 to the power brake housing 98. Oil sealing means 100 may be provided between the bracket 88 and the movable sleeve 86. At its inner end the sleeve 86 carries a roller 102 which is mounted by the provision of a needle roller bearing 104 so that the roller 102 is free to rotate smoothly.

In Figure 4 the lever 52 is shown to have a rounded end 105 for thrust contact with the bottom of a slot 107 in a plunger 108. A small retaining pin 106 is provided to prevent separation between the lever 52 and the plunger 108. The plunger 108 is a thrust member which carries at its inner end a roller 110 mounted by needle roller bearing 112. The thrust plunger is slidably mounted in the bracket 56 and oil sealing means 114 may be provided between the bracket 56 and the member 108. The rollers 102 and 110 are adapted to derive thrust movement from a cam plate 116, which is a part of the power brake unit, as will be later described. The power brake will be brought into operation by the movement of the brake pedal 118, pivoted at 120 and connected by link 122 to the input lever arm 124 of the power brake unit 126. An emergency lever 128 may be provided carried by rock shaft 130 and connected through cable 132 to the lower ends of levers 68, as indicated at 134 in Figure 5.

It will, therefore, be understood that by operating the brake pedal 138 the power brake is brought into action by the rotation of cam plate 116 and the front brakes are operating through an entirely independent linkage from that of the rear brakes while the rear brakes alone can be independently operated by the emergency lever. A short cable 133, shown in Figures 2 and 4, when provided, will also operate the front brakes through its connection at 135 with the side of lever 52.

Referring to Figures 8 to 11, inclusive, the construction of the power brake unit is illustrated. The drive shaft 136 rearwardly extends from the transmission casing through the power brake casing 126. A pair of sleeves 138 and 140 are assembled upon the shaft and constitute securing means for the usual speedometer worm 142. A hub member 144 is keyed upon the shaft 136 and constitutes a mounting for the rotatable friction mats 146, which are slidable axially with respect to the splines 148 on the inner hub 144. These annular disk members 146 are molded friction members but may be composed of woven fabric suitably mounted on plates in which teeth are cut to contact with hub 144, or may be mounted directly on splined shaft 136. The friction mats 146 contact at their inner faces with a central output member 150 which is made up as a double plate having a space 152 therebetween which will aid in cooling. An input friction plate 154 is adapted to contact the forward face of one of the members 146 and is actuated from the input lever 124 through the input rock shaft 156, which is mounted in the bearing sleeves 158 and 160. The rock shaft 156 carries thrust rollers 162, bearing against the track 164 on the input member 154. Rollers 162 are shown rounded to permit true rolling on a point contact but they may be made conical and the contact track 164 also made conical so as to permit true rolling on a line contact. The track 164 in the input member 154 may be hardened or chilled. Figure 11 also illustrates the mounting of the speedometer drive shaft 166 which has a worm 168 meshing with the speedometer worm 142.

The cam plate 116, which has previously been referred to, constitutes the output member of the power brake device. The input member 154 is carried by and rotates with a central double plate member 150 by the provision of lugs or teeth 170 on the input plate 154, which overhang and slidably fit into slots or recesses cut in the marginal edge of the double plate 150. The double plate 150 is similarly carried by the output cam plate 116 by the provision of lugs or teeth 172. If desired, the central double plate 150 may be eliminated and the input plate carried directly on the output plate. The contact faces of the teeth or lugs 170 and 172 may be at an angle to assist in spreading of the plates upon release, such as shown in the detail view Figure 12, and springs 174 may also be provided to assist in spreading the plates and prevent drag.

In the form of construction shown in Figure 10, the cam plate 116 is rotatably mounted on a sleeve 176 which, in turn, carries a sleeve 178, both of which are centrally located by the inwardly flanged portion 180 of the casing 126. The sleeve 176 has a shoulder 182 for taking the axial thrust from the cam plate 116 in one direction while the sleeve 178 has a shoulder 184 for taking the axial thrust in the opposite direction. If desired, rollers 186 as shown in Figure 8, having shafts 188, may be mounted in the cam plate 116 in order that the rollers 186 will serve to transmit the thrust to the shoulder 182 and 184 and support the cam plate, central plate and input plate for rotation.

The assembly of the power brake device is completed by the provision of a ball bearing unit 190 intermediate the drive shaft 136 and the sleeve 176. A flanged drive disk 192 is carried by the shaft 136 adjacent the bearing 190 and is held in position by nut 194 at the end of the shaft. The chamber 196 within the power brake casing 126 is adapted to receive oil for lubricating and cooling purposes and the chamber is sealed by the provision of an oil sealing unit 198 mounted in the sleeve 176 and in sealing engagement with the drive member 192. Oil from the transmission may be circulated through the housing 196 to further provide cooling.

The cam plate 116 is illustrated in detail in Figures 13, 14, and 15. The plate 116 has formed thereon an annular cam surface 200 which may be formed as shown by Figure 15. The inclined faces 202 and 204 are adapted to transmit movement to the output thrust members 108 and 86, respectively. Thus, the surface 202 tends to transmit the brake actuating force to the front wheel brakes while the inclined cam surface 204 transmits the brake actuating force to the rear wheel brakes during forward movement of the vehicle, while the oppositely inclined cam faces 206 and 208, respectively, will cooperate with the output thrust members 108 and 86 during the rearward movement of the vehicle.

It is highly important that the cam surface be properly laid out in relation to the co-efficient of friction between the friction mats 146 and the metal friction members which cooperate therewith. It should be understood that when an input force is first applied, an axial thrust load will immediately be transmitted to the thrust shoulder 184. However, as the cam plate 116 rotates, due to the rotation of the friction mats 146 by the drive shaft 136, a reaction will be set up as the wheel brakes are applied which will tend to decrease the thrust against the shoulder 184. Theoretically, if the cam surfaces are properly designed with respect to the co-efficient of friction, the reaction developed will be such that the cam plate 116 will be maintained in substantial balance between the thrust shoulders 182 and 184, and in such case the input force will be in exact proportion to the output force and perfect modulation of the braking action may be obtained. While it may not be possible from a practical standpoint to obtain such a balanced reaction in commercial production with the member 212 maintained between the thrust shoulders 182 and 184, it is desirable to approach these conditions as closely as possible. The construction shown endeavors to approach as closely as possible this theoretically possible condition, and it will be apparent that the closer the desired condition is approached, the less will be the strain on the parts involved.

The angle of the cam may be approximately determined as follows: Assume the input load is applied at oppositely spaced points through the input rollers 162. The frictional torque developed between the friction surfaces is equal to the input load times the co-efficient of friction. This frictional torque is acting at the mean radius of the friction mats, which are rotatable with the propeller shaft. The cam torque will either be greater or less than the frictional torque, dependent upon whether the radius of the cam is less or greater than the mean radius of the friction mats. After the cam torque has been determined the tangent of the angle of the cam is found by the ratio between one-half the cam torque and one-half the input load, since the load of the cam is taken off at two points by the provision of two cam-operated plungers.

As shown in Figure 15 openings 210 may be provided in the cam plate 116 to receive the shaft 188 for the rollers 186 and cut-outs 212 may be provided in the inner flange 214 of the cam plate 116 to receive the rollers 186.

Figure 16 illustrates a construction which may be used with a torque tube type of car. A spherical torque tube end 216 is carried by the fixed spherical housing 218. To offset the torque tube moment, a push-pull pedal to input lever may be provided as shown in Figure 28. The pedal 118' is connected by the push pull link 122' to the double ended input lever 124'. The power brake casing 220 in this form is constructed as part of the torque tube 222 and the casing 220 is secured by bolts 224 to the flange 226 formed integral with the spherical end 216 and the casing 220 in turn is secured by bolts 228 to the torque tube 222. The drive shaft 230 in this form is mounted in the bearing sleeve 232 carried by the spherical end 216 of the torque tube and has a drive sleeve 234 keyed thereto, having teeth 236 for driving the rotatable friction mats 238. The input member 240 is operated in the usual way from the input rock shaft 242. The central friction member 244 corresponds to that previously described and the output member 246 is formed as a cam plate for transmitting the output brake actuating force in a manner such as previously described.

The cam plate 246 in this construction is mounted on the outer race ring 248 of a ball bearing unit 250. The plate 246 has a shoulder 252 for transmitting axial thrust in one direction to the bearing 250 and a ring 254 is provided through which the cam plate 246 is secured to the race ring and through which the cam plate is held in position on the race ring 248 and constitutes a thrust receiving abutment in the opposite direction of axial thrust. The inner race ring 256 of the bearing 250 bears against a shoulder 258 of the casing 220 and is held in position by mounting sleeve 260 having a flange shoulder 262 at one end for engaging the forward end of the race ring 256. The sleeve 260 is locked in position with respect to the casing 220 by the provision of a locking ring 264 and an oil sealing unit 266 may be provided for sealing the chamber 268 of the power brake casing. It should be noted that the ball bearing is so mounted that it is stationary except when the cam moves, lowering the wear thereon.

If it is necessary to employ a bearing at this point for the shaft, such as when a free wheeling unit is employed, it is desirable to incorporate an independent ball bearing for mounting the cam plate, such as illustrated in Figure 17, in which a ball bearing 270 is carried by the brake casing 272 and constitutes a bearing for the rotatable drive shaft. An independent ball bearing 274 is carried by the stationary outer race ring 276 of the inner bearing 270 and the independent ball bearing 274 constitutes a support for the rotatable cam plate 278. The cam plate 278 has a shoulder 280 and a locking ring 282 for transmitting axial thrust through the bearing 274. The input plate 283 is connected to the output plate 278 by the key 284. The friction members 285 and 286 are separated by the intermediate plate 287. The friction members 285 and 286 are keyed to the rotary member 288 and rotate therewith but are free to move axially along the member. The key or lug 284 may be similar to the lugs 170 and 172 shown in Figure 12.

Figures 18 to 25, inclusive, illustrate a slightly modified design of the power brake unit and a system in which hydraulic brakes are actuated by the power unit. Referring to Figures 18 and 19 the power brake casing 300 has mounted thereon a hydraulic cylinder 302 and an independent hydraulic cylinder 304. The cylinder 302 is connected by pressure line 306 to the line 308 which transmits the hydraulic pressure to actuate standard hydraulic wheel brakes for the front wheels of the vehicle. The cylinder 304 is connected by pressure line 310 to a hydraulic cylinder 312 carried by the rear axle 314. The cylinder 312 actuates cross shafts 316 which are connected for actuation of mechanical rear wheel brakes. The emergency lever 318 is connected by link 320 to actuate the rear wheel brakes through the cross shafts 316 independent of the hydraulic operation thereof. Since the cylinders 302 and 304 are entirely independent, it is obvious that any single failure in the pressure lines will only result in the loss of one set of brakes while the other set of brakes will still be operative, which is a very desirable feature.

The construction of the cylinder 312 is shown in detail in Figures 19, 20, and 21. The cylinder has an inlet opening 322 adapted to receive fluid pressure to produce movement of the piston 324 within the cylinder. The piston carries a sealing washer 326 which is pressed into engagement with the side walls of the cylinder by spring 328. Upward movement of the piston transmits output movement of the yoke arms 330 through the roller 332. The arms 330 are connected to the rock shaft 316. The emergency lever connecting link 320 to the levers 330 is also illustrated in Figures 19 and 20. The lever arms 330 are sealed with respect to the cylinder 312 by the flexible boot 334. Any fluid which may leak past the piston is caused to flow back in the pressure line through the one-way bleed valve 336.

Figure 22 illustrates the construction of the cylinder 302 for operation of the front wheel brakes. The end cap 338 has an outlet connection 340 for transmission of the fluid pressure through line 306 (shown in Figure 19). The piston 342 in the cylinder is operated by plunger 344. The piston 342 is held in normal released position by the spring 346. The plunger 344 is made hexagonal in cross section to cooperate with the correspondingly-shaped bearing 348 formed by the cylinder 302 to prevent turning. The plunger 344 at its inner end carries a roller 350 bearing against the cam plate 352 of the power brake unit. The cylinder 304 has a corresponding plunger 354 carrying roller 356 cooperating with the cam plate 352. The power brake casing 300 surrounds the drive shaft 358 which has mounted thereon a drive disk 360 to which the friction mats 362 are keyed for rotation therewith. The input pressure plate 364 is operated by the input rock shaft 366 which carries rollers 368 bearing against the track 370 on the forward face of the brake 364. The cam plate 352 is mounted between thrust shoulders 372 and 374 and the rollers 376 carried by the cam plate are adapted to bear against the thrust shoulders. The shoulder 372 is formed on the sleeve 378 which is mounted by the inward flange portion 380 of the casing 300. A ball bearing unit 382 is provided to constitute a bearing for the shaft 358 and an oil seal unit 384 is inserted between the sleeve 378 and the drive sleeve 386. Spring plates 368, Figure 22, between the friction mats 362 are keyed for rotation with plates 364 and 352 and assist in separating the friction plates and also provide a different feel to the brake pedal.

Figures 26 and 27 illustrate a modified form of spring element for separating the plates. Thus, the spring element 175 is carried by a lug 177 on the central plate 150 and the ends of said spring element bear against lugs 179 on the cam plate.

It is an advantageous feature of my construction, as shown in Figure 22, that no output levers are required associated with the power brake unit but, instead, the output force is better transmitted directly to plungers which act upon the hydraulic pistons. Although it may be desirable that the plungers should act substantially parallel to the axis of the central shaft, it is still within the scope of my invention to have the plungers act at angles to the central shaft so long as an appreciable component of force is obtained acting parallel to the shaft to oppose the input thrust and to provide modulation.

Various other changes and modifications may be resorted to without departing from the spirit of my invention as expressed in the appended claims.

I claim:

1. A power brake unit for motor vehicles comprising, a shaft rotatable during movement of the vehicle, a friction element positively rotatable with said shaft and free to move axially of said shaft, a contact plate mounted for rotation adjacent said friction element, input means operative to produce an input thrust acting in a direction to produce frictional contact between said frictional element and said contact plate and output means movable in substantial alignment with the input means, operative by rotative movement of said contact plate from its normal position to develop an output brake reaction acting in a direction substantially opposed to the input thrust.

2. A power brake unit for motor vehicles comprising, a shaft rotatable during movement of the vehicle, a friction element positively rotatable with said shaft and free to move axially of said shaft, a contact plate mounted for rotation adjacent said friction element, input means operative to produce an input thrust acting in a direction to produce frictional contact between said frictional element and said contact plate and output means movable in substantial alignment with the input means, operative by rotative movement of said contact plate from its normal position to develop an output brake reaction acting in a direction substantially opposed to the input thrust and substantially equivalent thereto.

3. A power brake unit for motor vehicles comprising, a shaft rotatable during movement of the vehicle, a friction element positively rotatable with said shaft and free to move axially of said shaft, a contact plate mounted for rotation adjacent said friction element, input means operative to produce an input thrust acting in a direction to produce frictional contact between said frictional element and said contact plate, output means operative by rotative movement of said contact plate from its normal position to develop an output brake reaction acting in a direction substantially opposed to the input thrust and thrust abutment means associated with said output means to take up the excess input thrust or excess output reaction.

4. In a power brake system, a drive shaft, a friction member rotatable with said drive shaft but free to move axially with respect thereto, input means for applying a substantially axially directed friction-producing thrust against one side of said friction member, output brake actuating means transmitting the developed brake reaction as a substantially axially directed friction-producing thrust against the other side of said friction member, said output means including an element frictionally rotatable by said friction member to produce the braking reaction, and an element movable substantially axially to transmit the braking reaction.

5. In a power brake system, a drive shaft, a friction member rotatable with said drive shaft but free to move axially with respect thereto, normally stationary input and output plates on opposite sides of said friction member, input means for developing an axial thrust against said input plate to frictionally grip said friction member between said plates and to produce rotation of said output plate, substantially axially extending output means movable by the rotation of said output plate to transmit the brake actuating force and to develop a brake reaction having a component acting in a direction parallel to the axis of said shaft upon said output plate in opposition to said input thrust.

6. In a power brake system, a drive shaft, a friction member rotatable with said drive shaft but free to move axially with respect thereto, input and output plates on opposite sides of said friction member, said input and output plates being keyed to rotate as a unit, input means for producing an axial thrust upon said input plate to force said plate into frictional contact with said friction member thus forcing the friction member into frictional contact with the output plate to cause rotation of said output plate, a cam formed on said output plate, output brake actuating means movable by contact with said cam upon rotation of said output plate, whereby the developed brake reaction imposes a thrust upon said output plate opposing the input thrust upon said input plate.

7. In a power brake system, a drive shaft, a friction member rotatable with said drive shaft but free to move axially with respect thereto, input and output plates on opposite sides of said friction member said input and output plates being keyed for rotation as a unit, means supporting said output plate for rotation including thrust shoulders for receiving axial thrust from said output plate in either direction, input means for producing an axial thrust upon said input plate to force said plate into frictional engagement with said friction member thus forcing the friction plate into frictional contact with the output plate to cause rotation of said output plate whereby the reaction to said input axial thrust is initially received by one of said thrust shoulders, said output plate having a cam surface formed thereon, a cam follower cooperating with said cam surface movable in a direction substantially parallel to the axis of said shaft to transmit a brake actuating force upon rotation of said output plate, whereby the developed brake reaction tends to oppose the input thrust and to relieve the reaction of said output plate against said one thrust shoulder.

8. In a power brake system, a drive shaft, a power brake housing concentric with said drive shaft, a friction member rotatable with said drive shaft within said housing and free to move axially with respect to said shaft, an input plate on one side of said friction member, an output cam plate on the other side of said friction member, a keyed connection between said plates, an input rock shaft carried by said housing adapted to transmit an axial thrust against said input plate, a pair of output cam followers mounted by said housing for movement in a direction substantially parallel to the axis of said shaft and actuated by the rotation of said output cam plate, each of said cam followers being adapted to be connected to an output brake linkage whereby the developed brake reaction is transmitted as a thrust against said output cam plate opposing the input thrust.

9. In a power brake unit for motor vehicles, a drive shaft, a friction element positively rotatable with said drive shaft and free to float axially with respect to said shaft, an input pressure plate on one side of said friction element, an output pressure plate on the other side of said friction element, input means for producing a thrust upon said input plate, said output plate having a face cam thereon and a pair of output plungers in thrust engagement with said face cam.

10. In a power brake unit for motor vehicles, a drive shaft, a friction element positively rotatable with said drive shaft and free to float axially with respect to said shaft, an input pressure plate on one side of said friction element, an output pressure plate on the other side of said friction element, input means for producing a thrust upon said input plate, said output plate having a face cam thereon and a pair of output plungers in thrust engagement with said face cam, and means for supporting said input pressure plate on and for rotation with said output pressure plate.

11. In a power brake unit for motor vehicles, a drive shaft, a friction element positively rotatable with said drive shaft and free to float axially with respect to said shaft, an input pressure plate on one side of said friction element, an output pressure plate on the other side of said friction element, input means for producing a thrust upon said input plate, said output plate having a face cam thereon and a pair of output plungers in thrust engagement with said face cam, and resilient means for separating said plates.

12. In a power brake for motor vehicles, a propeller shaft, a power brake housing through which said shaft extends, a friction element positively rotatable with said shaft and free to float axially with respect to said shaft within said housing, an input pressure plate on one side of said friction element, an output pressure plate on the other side of said friction element, means for supporting the input pressure plate on and for rotation with said output pressure plate, anti-friction means for rotatably supporting said output pressure plate by said housing and for taking up axial thrust in either direction upon said output pressure plate, input means for producing an input thrust upon said input pressure plate, said output pressure plate having a face cam thereon and output plungers slidably mounted by said housing in thrust engagement with said face cam and adapted to transmit the output reaction in a direction opposed to the input thrust, whereby the thrust load upon said anti-friction means is reduced to a minimum.

13. In a power brake unit for motor vehicles, a positively rotatable friction element, a normally stationary output plate adapted to frictionally engage said friction element and having a face cam thereon, the angle of which is determined by the co-efficient of friction between said friction element and said output plate, and an axially movable output plunger engaging said cam face.

14. In a power brake unit for motor vehicles, a power brake casing through which a propeller shaft extends, a ball bearing unit for rotatably supporting said propeller shaft upon said casing, a friction element positively rotatable with said shaft within said casing, an input pressure plate on one side of said friction element, an output pressure plate on the other side of said friction element, means for supporting said input plate upon said output plate for rotation therewith, an anti-friction bearing unit carried by said first-mentioned ball bearing for rotatably supporting said output plate, input means for producing a thrust upon said input plate to cause frictional engagement between said friction element and said plates, a face cam upon said output plate and output thrust plungers slidably mounted by said casing and contacting said face cam.

15. In a power braking system, a power brake unit associated with the propeller shaft of the vehicle comprising a friction plate rotatable with the propeller shaft, an input pressure plate on one side of said friction plate, an output pressure plate on the other side of said friction member, a double cam surface on said output member, a pair of independent plungers slidably mounted by the housings of said power brake unit, a pair of hydraulic cylinders mounted on said power brake housing, each cylinder having a piston co-operating with one of said plungers, hydraulic connections from one of said cylinders to the front wheel brakes of the vehicle and hydraulic connections from the other of said cylinders to the rear wheel brakes of the vehicle.

16. In a power brake system, a drive shaft, a friction member rotatable with the drive shaft and movable relative thereto, input means for applying a friction producing thrust against one side of the friction member, substantially axially extending output brake actuating means transmitting the developed brake reaction as a friction producing thrust against the other side of said friction member, said output means including an element frictionally rotatable by said friction member to produce the braking reaction.

17. A power brake unit for motor vehicles comprising, a shaft rotatable during movement of the vehicle, a friction element positively rotatable with said shaft and movable axially of said shaft, a contact plate mounted for rotation adjacent said friction element, input means operative to produce an input thrust acting in a direction to produce frictional contact between said frictional element and said contact plate, output means operative by rotative movement of said contact plate from its normal position to develop an output brake reaction acting in a direction substantially opposed to the input thrust, and anti-friction means supporting the contact plate and output means.

18. A power brake unit for motor vehicles comprising, a shaft rotatable during movement of the vehicle, a friction element positively rotatable with said shaft and free to move axially with said shaft, said friction element comprising a plurality of spaced friction members and a spacing member intermediate said friction members, a contact plate mounted for rotation adjacent said friction element, input means operative to produce an input thrust acting in a direction to produce frictional contact between said frictional element and said contact plate, and substantially axially movable output means operative by rotative movement of said contact plate from its normal position to develop an output brake reaction acting in a direction substantially opposed to the input thrust.

19. A power brake unit for motor vehicles comprising, a shaft rotatable during movement of the vehicle, a friction element positively rotatable with said shaft and free to move axially with said shaft, said friction element comprising a plurality of spaced friction members and a spacing member having air cooling cavities therein intermediate said friction member, a contact plate mounted for rotation adjacent said friction element, input means operative to produce an input thrust acting in a direction to produce frictional contact between said frictional element and said contact plate, and output means operative by rotative movement of said contact plate from its normal position to develop an output brake reaction acting in a direction substantially opposed to the input thrust.

20. In a power brake unit for motor vehicles, a drive shaft, a friction element positively rotatable with said drive shaft and free to float axially with respect to said shaft, an input pressure plate on one side of said friction element, an output pressure plate on the other side of said friction element, input means for producing a thrust upon said input plate, interfitting lugs and recesses supporting the input plate on the output plate, said lugs and recesses having angular contact faces to assist in spreading the plates upon release, and output means for taking the thrust from the output plate.

21. In a power brake unit for motor vehicles, a drive shaft, a friction element positively rotatable with said drive shaft and free to float axially with respect to said shaft, an input pressure plate on one side of said friction element, an output pressure plate on the other side of said friction element, input means for producing a thrust upon said input plate, resilient means for separating the plates, interfitting lugs and recesses supporting the input plate on said output plate, said lugs and recesses having angular contact faces to assist in spreading the plates upon release, and output means for taking the thrust from the output plate.

22. In a power brake unit for motor vehicles, a drive shaft, a friction element positively rotatable with said drive shaft and free to float axially with respect to said shaft, an input pressure plate on one side of said friction element, an output pressure plate on the other side of said friction element, input means for producing a thrust upon said input plate, said output plate having a face cam thereon and a pair of output plungers in thrust engagement with said face cam, and a U-shaped spring carried by one plate and having the legs of the U engaging the other plate for separating said plates.

23. In a power brake unit for motor vehicles, a drive shaft, a friction element positively rotatable with said drive shaft and free to float axially with respect to said shaft, an input pressure plate on one side of said friction element, an output plate on the other side of said friction element, input means for producing a thrust upon said input plate, said output plate having a cam surface thereon, and an axially movable output plunger held against rotation adjacent the cam face and having anti-friction means engaging the cam face.

24. In a power brake unit for motor vehicles, a drive shaft, a friction element positively rotatable with said drive shaft and movable axially with respect to the shaft, an input pressure plate on one side of said friction element, an output plate on the other side of said friction element, means connecting the input and output plates to cause joint rotative movement thereof, an input yoke adjacent the input plate and anti-friction means carried by the yoke and engaging the input plate.

25. In a power brake unit for motor vehicles, a drive shaft, a friction element positively rotatable with said drive shaft and movable axially with respect to the shaft, an input pressure plate on one side of said friction element, an output pressure plate on the other side of said friction element, means connecting the input and output plates to cause joint rotative movement thereof, said means supporting the input plate upon the output plate, an anti-friction bearing supporting the output plate, an input yoke adjacent the input plate and anti-friction means carried by the yoke and engaging the input plate.

26. In a power brake for motor vehicles, a drive shaft, a friction element positively rotatable with said drive shaft and free to move axially with respect to said shaft, an input pressure plate on one side of said friction element, an output pressure plate on the other side of said friction element, input means for producing a thrust upon said input plate, said output plate having a cam thereon and a pair of output plungers in thrust engagement with the cam, means for separating said plates, front and rear wheel brakes associated with said power brake, means connecting one of said plungers to the front wheel brakes and means connecting the other plunger to the rear wheel brakes.

27. In a power brake unit for motor vehicles, a drive shaft, a friction element positively rotatable with said drive shaft and free to float axially with respect to said shaft, an input pressure plate on one side of said friction element, an output plate on the other side of said friction element, input means for producing a thrust upon said input plate, resilient means for separating the plates, interfitting lugs and recesses supporting the input plate on said output plate, said lugs and recesses having angular contact faces to assist in spreading the plates upon release, and output means for receiving power for brake actuation from the output plate.

28. A power brake unit for motor vehicles comprising a shaft rotatable during movement of the vehicle, a friction element positively rotatable with said shaft and movable axially of the shaft, a contact plate mounted for rotation adjacent said friction element, input means operative to produce an input thrust acting in a direction to produce frictional contact between said frictional element and said contact plate, output means including an axially extending cam surface operative by rotative movement of said contact plate from its normal position to develop an output braking force at least a portion of which acts against the input force, said force which acts against the input force being proportional to the input force whereby substantially perfect modulation of the braking action can be obtained.

29. A power brake unit for motor vehicles comprising, a shaft rotatable during movement of the vehicle, a friction element positively rotatable with said shaft and movable axially of said shaft, a contact plate mounted for rotation adjacent said friction element, input means operative to produce an input thrust acting in a direction to produce frictional contact between said frictional element and said contact plate, output means comprising an axially extending cam and associated cam thrust member operative by rotative movement of said contact plate from its normal position to develop an output braking force, at least a portion of which acts against the input force, said force acting against the input force being proportional to the input force, and anti-friction means supporting the contact plate and output means.

30. In a power brake unit for motor vehicles, a drive shaft, a friction element positively rotatable with said drive shaft and movable axially with respect to said shaft, an input pressure plate on one side of said friction element, an output plate upon the other side of said friction element, input means for producing a thrust upon said input plate, means for separating the plates, and interfitting means whereby one of said plates is supported upon the other of said plates.

31. In a power brake unit for motor vehicles, a power brake casing through which a propeller shaft extends, a ball bearing unit for rotatably supporting said propeller shaft upon said casing, a friction element positively rotatable with said shaft within said casing, an input pressure plate on one side of said friction element, an output pressure plate on the other side of said friction element, means for supporting said input plate upon said output plate for rotation therewith, an anti-friction bearing unit carried by said first-mentioned ball bearing for rotatably supporting said output plate, input means for producing a thrust upon said input plate to cause frictional engagement between said friction element and said plates, a cam upon said output plate and output thrust plungers slidably mounted by said casing and contacting said cam.

32. In a power brake unit for motor vehicles, a drive shaft, a friction element positively rotatable with said drive shaft and free to float axially with respect to said shaft, an input pressure plate on one side of said friction element, an output pressure plate on the other side of said friction element, input means for producing a thrust upon said input plate, interfitting lugs and recesses supporting one of said plates upon the other plate, said lugs and recesses having angular contact faces to assist in spreading the plates upon release, and output means for taking the thrust from the output plate.

EDWIN R. EVANS.